(12) United States Patent
Honda

(10) Patent No.: US 9,845,889 B2
(45) Date of Patent: Dec. 19, 2017

(54) MAGNETIC FLUID SEAL DEVICE

(75) Inventor: Shigeki Honda, Tokyo (JP)

(73) Assignee: EAGLE INDUSTRY CO., LTD. (JP)

( * ) Notice: Subject to any disclaimer, the term of this patent is extended or adjusted under 35 U.S.C. 154(b) by 20 days.

(21) Appl. No.: 13/820,438

(22) PCT Filed: Nov. 4, 2011

(86) PCT No.: PCT/JP2011/075459
§ 371 (c)(1),
(2), (4) Date: Mar. 1, 2013

(87) PCT Pub. No.: WO2012/086320
PCT Pub. Date: Jun. 28, 2012

(65) Prior Publication Data
US 2013/0193647 A1 Aug. 1, 2013

(30) Foreign Application Priority Data
Dec. 23, 2010 (JP) .................................. 2010-286823

(51) Int. Cl.
*F16J 15/43* (2006.01)
*F16J 15/3232* (2016.01)
*F16C 33/76* (2006.01)

(52) U.S. Cl.
CPC ............ *F16J 15/43* (2013.01); *F16J 15/3232* (2013.01); *F16C 33/765* (2013.01)

(58) Field of Classification Search
CPC F16J 15/43; F16J 15/445; F16J 15/064; F16J 15/3232; F16C 33/746; F16C 33/765
USPC ........ 277/410, 302, 501, 629, 920, 395, 530
See application file for complete search history.

(56) References Cited

U.S. PATENT DOCUMENTS

| 2,137,233 | A | * | 11/1938 | Brotzman | ............... A01B 41/04 172/195 |
|---|---|---|---|---|---|
| 2,834,618 | A | * | 5/1958 | Wiltse | ........................... 277/428 |
| 3,914,072 | A | * | 10/1975 | Rowley | ................. F04D 29/126 277/371 |
| 4,527,802 | A | | 7/1985 | Wilcock et al. | ................... 277/1 |

(Continued)

FOREIGN PATENT DOCUMENTS

| JP | 61182787 | 8/1986 |
|---|---|---|
| JP | 4138163 | 12/1992 |

(Continued)

OTHER PUBLICATIONS

International Search Report issued in corresponding application No. PCT/JP2011/075459, dated Jan. 31, 2012 (4 pgs).

(Continued)

*Primary Examiner* — Nathan Cumar
(74) *Attorney, Agent, or Firm* — Hayes Soloway P.C.

(57) ABSTRACT

A cartridge-type magnetic fluid seal device has a flanged sleeve fixed to an external peripheral surface of the radially inside member of two members and which rotates together with the inside member is provided facing a pair of magnetic pole members. A packing is disposed in an annular space formed by the radial inside of a magnetic source and the pair of magnetic pole members. The packing is provided in the annular space so as to slide on an external peripheral surface of the flanged sleeve, and a magnetic fluid seal part, the packing, and the flanged sleeve form a unit.

17 Claims, 7 Drawing Sheets

(56) References Cited

U.S. PATENT DOCUMENTS

| | | | | |
|---|---|---|---|---|
| 4,989,885 | A * | 2/1991 | Iwata | F16J 15/40 |
| | | | | 277/410 |
| 6,976,682 | B1 * | 12/2005 | Macleod et al. | 277/410 |
| 2001/0045701 | A1 * | 11/2001 | Toal | F16J 15/3404 |
| | | | | 277/370 |
| 2004/0164496 | A1 * | 8/2004 | Okada | F02M 59/442 |
| | | | | 277/549 |
| 2004/0262846 | A1 * | 12/2004 | Anzai | F16J 15/43 |
| | | | | 277/410 |
| 2009/0179385 | A1 * | 7/2009 | Komino | F16J 15/43 |
| | | | | 277/410 |
| 2010/0230903 | A1 | 9/2010 | Honda | 277/501 |

FOREIGN PATENT DOCUMENTS

| | | | |
|---|---|---|---|
| JP | 671969 | | 10/1994 |
| JP | 7111026 | | 4/1995 |
| JP | 07 317 916 | A * | 12/1995 |
| JP | 7317916 | | 12/1995 |
| JP | 07317916 | A * | 12/1995 |
| JP | 07317916 | A * | 12/1995 |
| JP | 2003240131 | | 8/2003 |
| JP | 2010110256 | | 5/2010 |
| JP | 2011/075459 | | 1/2012 |
| WO | WO02095271 | | 11/2002 |
| WO | WO2010004935 | | 1/2010 |

OTHER PUBLICATIONS

International Preliminary Report on Patentability and Written Opinion issued in corresponding application No. PCT/JP2011/075459, dated Jun. 25, 2013 (6 pgs).

Taiwanese Office Action (w/translation) issued in related application No. 100144157, dated Jun. 30, 2014 (9 pgs).

First Notification of Reason for Refusal issued in corresponding Chinese Patent Appln. No. 201180051308.3 dated Aug. 27, 2014, with English translation (10 pgs).

* cited by examiner

Prior Art

Prior Art

Prior Art

MAGNETIC FLUID SEAL DEVICE

TECHNICAL FIELD

The present invention relates to a seal device which uses a magnetic fluid, the seal device being used in shaft seals for fishing gear, semiconductor manufacturing devices, industrial equipment, and various other types of devices.

BACKGROUND ART

A magnetic fluid seal device is known as an example of a high-performance seal device that is clean and has long service life. This magnetic fluid seal device is widely used as a vacuum seal for introducing rotational drive force in a vacuum, a dust-proof seal for preventing bearing oil mists or the like from contaminating clean areas, or a gas seal or the like in various coating/etching processes or in manufacturing processes for semiconductors, liquid crystals, and the like in which there is a need for a maintenance-free shaft seal mechanism by which a clean atmosphere is obtained.

FIG. 5 is a sectional view showing the configuration of conventional example of a sealing device which uses a magnetic fluid (hereinafter referred to as "Prior Art 1;" see Patent Document 1, for example).

This magnetic fluid shaft seal device 50 has a cylindrical casing 52 on a wall 51 which forms a process chamber 60. In a state in which a relatively large amount of dust is present on an outboard side A, the magnetic fluid shaft seal device 50 maintains an inboard side L in a clean state, i.e., a dust-proof state, in which there is minimal dust.

The casing 52 surrounds a rotating shaft 53 extending through the inside and outside of the process chamber 60. An annular main pole piece 54 centered around the rotating shaft 53 and formed by a magnetic material, and an annular secondary pole piece 55 positioned on the right side of the main pole piece 54 and also centered around the rotating shaft 53 are housed inside the casing 52. An annular magnet 56 centered around the rotating shaft 53 is provided between the main pole piece 54 and the secondary pole piece 55. A concave groove 58 for accommodating a ring member 57 is formed between the main pole piece 54 and the secondary pole piece 55.

A slight gap is formed between an internal peripheral surface of the main pole piece 54 and an external peripheral surface of the rotating shaft 53, and between an internal peripheral surface of the secondary pole piece 55 and the rotating shaft 53, and a magnetic fluid is injected into each gap. A magnetic force line emanating from the magnet 56 forms a magnetic closed circuit through the main pole piece 54, the rotating shaft 53, and the secondary pole piece 55 and returning to the magnet 56, as indicated by the arrow B, and the magnetic fluid is focused at the magnetic force line to form magnetic fluid films 59.

Since the magnetic fluid shaft seal device 50 is configured as described above, environmental variations between the outboard side A and the inboard side L, e.g., pressure differences, variations in the gas atmosphere and amount of dust, and other variations, are maintained by the magnetic fluid films 59 and the ring member 57 in pressurized contact with the rotating shaft 53.

However, in the magnetic fluid shaft seal device 50 of Prior Art 1, impacts, vibrations, and other disturbances cause the magnetic fluid to scatter to the outboard side A or the inboard side L through the gap with the external peripheral part of the rotating shaft 53. When the magnetic fluid leaks out due to this scattering, the functioning of the magnetic fluid seal is compromised, and the outboard side A or the inboard side L becomes contaminated. Such leakage must therefore be prevented.

FIG. 6 is a sectional view showing the configuration of a magnetic fluid seal structure provided with a means for preventing leakage of magnetic fluid (hereinafter referred to as "Prior Art 2;" see Patent Document 2, for example).

This magnetic fluid seal 70 has a magnet 72 fixed to an internal peripheral part of a hub 71, and a pair of pole pieces (magnetic pole pieces) 73, 73 disposed in the axial direction on end faces of both sides of the magnet 72 in the axial direction thereof, and magnetic fluid 74 is retained at the internal peripheral edges of the pole pieces 73.

A magnetic ring 76 is fitted on an end portion (left end portion in the drawing) of a shaft 75 so as to face the magnetic fluid seal 70. The magnetic ring 76 is positioned so that the magnetic fluid 74 can make contact therewith, and is formed of a predetermined magnetically permeable body so that a magnetic circuit of the magnetic fluid seal 70 is formed. By this configuration, the magnetic fluid 74 is in close contact with the external peripheral surface of the magnetic ring 76, the opening between the shaft 75 and the hub 71 is sealed in pressure-resistant fashion, lubricating oil and the like are prevented from leaking to the outside, and penetration of dust and the like from outside a motor is prevented.

A leak prevention cover 77 for preventing the magnetic fluid 74 from scattering to the outside is also provided on the outboard side A of the magnetic fluid seal 70. The leak prevention cover 77 is configured so as to completely block the magnetic fluid 74 from the outboard side A, and an oil repellent agent 78 is applied to a wall face on the inside thereof in the axial direction, and to an axial end face of the magnetic ring 76.

In such a structure for a magnetic fluid seal, even when an impact, vibration, or other disturbance causes the magnetic fluid 74 to leak from the magnetic fluid seal 70, a leaked magnetic fluid 79 is first held back by a blocking wall surface of the leak prevention cover 77, and the surface tension of the oil repellent agent 78 then causes the leaked magnetic fluid 79 to form an oil droplet in a single mass without dissipating. The leaked magnetic fluid is then flung outward by centrifugal force from rotation and rapidly moved into a magnetic fluid reservoir 80.

In Prior Art 2, although magnetic fluid can be prevented from leaking, due to the structure of the seal, the magnetic fluid 74 cannot be injected into the portion for the pole pieces 73, 73 during assembly of the seal portion. The leak prevention cover 77 also obstructs injection of the magnetic fluid 74 from the outside after the seal portion is assembled in the device, and it is difficult to inject the magnetic fluid.

No provision is made for replacing seal components in Prior Art 1 and Prior Art 2, and component replacement is difficult in these seal devices.

The technique of Prior Art 2 is capable of sealing out only light dust or gas, and has the drawback of being incapable of sealing against mist or liquid.

An oil seal can seal against mist or liquid, but has the drawback of high torque.

FIG. 7 is a sectional view showing the configuration of a magnetic fluid seal device capable of sealing against mist or liquid (hereinafter referred to as "Prior Art 3;" see Patent Document 3, for example).

This magnetic fluid seal device 80 seals a gap between a non-magnetic housing 81 and a non-magnetic shaft 82 which is inserted into the housing 81, the housing and the shaft being two members which are assembled so as to be able to rotate relative to each other in concentric fashion.

The magnetic fluid seal device 80 is composed of a magnetic fluid seal member 80A formed by a permanent magnet 83 as a magnetic source magnetized in the axial direction, yokes 84 as a pair of pole pieces disposed on both sides of the permanent magnet 83, and a magnetic fluid 87 retained by magnetic attraction in a minute gap 86 between the yokes 84 and the housing 81 so as to form a seal via a sleeve 85 which is fixed to an internal periphery of the housing 81; and a labyrinth seal component 80B formed by a rotating body 88 fixed to the shaft 82 so as to rotate together with the shaft 82, and a labyrinth seal part 89 provided to the outer diameter side of the rotating body 88. The magnetic fluid seal device 80 is a labyrinth combination-type magnetic fluid seal device.

In the magnetic fluid seal device configured as described above, since labyrinth seal parts 89 formed by labyrinth seal components 80B are provided on both outer diameter sides of the magnetic fluid seal member 80A, even when small amounts of oil, water, or dust OL come toward the sealed side, since the rotating body 88 provided with the labyrinth seal part 89 also rotates when the shaft 82 rotates, the oil, water, or dust OL is shaken free by centrifugal force, the oil, water, or dust OL can be prevented from penetrating into the magnetic fluid seal member 80A, and it is possible to provide a seal against oil mist or grease from the inboard side L, and from oil, water, and other contaminants from the outboard side A.

However, in Prior Art 3, although a seal can be provided with respect to mist or liquid, the structure of the device makes it impossible to inject the magnetic fluid 87 to the pole piece 84 portion during assembly of the seal portion, the same as in Prior Art 1 and Prior Art 2. The rotating body 88 also obstructs injection of the magnetic fluid 87 from the outside after the seal portion is assembled in the device, and it is difficult to inject the magnetic fluid.

Like Prior Art 1 and Prior Art 2, Prior Art 3 also makes no provision for replacing the seal components, and component replacement is difficult.

PRIOR ART DOCUMENTS

Patent Documents

Patent Document 1: Japanese Laid-open Patent Publication No. 7-317916

Patent Document 2: Japanese Laid-open Patent Publication No. 7-111026

Patent Document 3: Japanese Unexamined Utility Model Application Publication No. 6-71969

Patent Document 4: WO Publication No. 2010/004935 Pamphlet

Patent Document 5: Japanese Laid-open Patent Publication No. 2010-110256

DISCLOSURE OF THE INVENTION

Problems to be Solved by the Invention

The present invention was developed in order to overcome the drawbacks of the prior art, and an object of the present invention is to provide a cartridge-type magnetic fluid seal device, in which the seal device is capable of sealing against dust, mist, and liquid, the magnetic fluid can be prevented from leaking, components can easily be replaced and assembled into the device, and the device is formed as a unit in which magnetic fluid can easily be enclosed.

Means for Solving the Problems

In order to achieve the abovementioned objects, the magnetic fluid seal device according to a first aspect of the present invention is a seal device for sealing a gap between two members which are assembled so as to be able to rotate relative to each other in concentric fashion, the seal device comprising a magnetic fluid seal part having:

a magnetic source for generating magnetic force, the magnetic source being disposed on a radially outside member of the two members;

a pair of magnetic pole members disposed on both sides of the magnetic source; and a magnetic fluid for sealing the gap, the magnetic fluid being magnetically retained between the two members by the magnetic force of the magnetic source; the magnetic fluid seal device characterized in that a flanged sleeve which fixed to an external peripheral surface of the radially inside member of the two members, and which rotates together with the inside member is provided facing the pair of magnetic pole members, a packing is disposed in an annular space formed by the radial inside of the magnetic source and the pair of magnetic pole members, the packing is provided in the annular space so as to slide on an external peripheral surface of the flanged sleeve, and the magnetic fluid seal part, the packing, and the flanged sleeve form a unit.

This first aspect makes it possible to provide a cartridge-type magnetic fluid seal device, in which the seal device is capable of sealing against dust, mist, and liquid, the magnetic fluid can be prevented from leaking, components can easily be replaced and assembled into the device, and the magnetic fluid can easily be enclosed in the device.

The magnetic fluid seal device according to a second aspect of the present invention is the seal device according to the first aspect, characterized in that the flanged sleeve comprises a cylindrical sleeve main body, an outward-facing flange part provided on an outboard side of the sleeve main body, and an inward-facing flange part and outward-facing flange part provided on an inboard side.

By the second aspect, the magnetic fluid can be prevented from leaking by the outward-facing flange parts. The inward-facing flange part can also ensure correct positioning and installation relative to the inside members.

The magnetic fluid seal device according to a third aspect of the present invention is the seal device according to the second aspect, characterized in that the sleeve main body of the flanged sleeve, the outward-facing flange part on the outboard side, and the inward-facing flange part on the inboard side are integrally formed, and the outward-facing flange part on the inboard side is formed as a separate body.

The magnetic fluid seal device according to a fourth aspect of the present invention is the seal device according to the second aspect, characterized in that the sleeve main body of the flanged sleeve, and the inward-facing flange part on the inboard side are integrally formed, and the outward-facing flange part on the outboard side and the outward-facing flange part on the inboard side are formed as separate bodies.

The magnetic fluid seal device according to a fifth aspect of the present invention is the seal device according to the second aspect, characterized in that the sleeve main body of the flanged sleeve, the outward-facing flange part on the outboard side, the outward-facing flange part on the inboard side, and the inward-facing flange part on the inboard side are formed as separate bodies.

By the third through fifth aspects, the flanged sleeve is easily fabricated, and the seal device can easily be assembled by retrofitting the outward-facing flange part on the inboard side.

The magnetic fluid seal device according to a sixth aspect of the present invention is the seal device according to any of the second through fifth aspects, characterized in that the sleeve main body of the flanged sleeve and the outward-facing flange part on the outboard side are formed of a magnetic material, and the outward-facing flange part on the inboard side is formed of a non-magnetic material.

Through the sixth aspect, any magnetic fluid that leaks out as a result of an impact or the like can be trapped by the distal end of the outward-facing flange part. Magnetic fluid that has leaked out near the outward-facing flange part on the inboard side L cannot be trapped, but this outward-facing flange part can still serve to prevent leakage of the magnetic fluid, and although some time is required, the magnetic fluid near the outward-facing flange part on the inboard side L that has been prevented from leaking is returned by the attraction of a strong magnetic field that occurs at the end part on the internal peripheral side of the magnetic pole members.

The magnetic fluid seal device according to a seventh aspect of the present invention is the seal device according to any of the second through sixth aspects, characterized in, that a folded part folded toward the side of the magnetic pole members is provided to an outer edge of the outward-facing flange part on the outboard side and the outward-facing flange part on the inboard side of the flanged sleeve.

Through the seventh aspect, it is possible to prevent movement, relative to each other, of the flanged sleeve and the X-ring and magnetic fluid seal part, which is composed of the magnetic source, the pair of magnetic pole members, and the magnetic fluid. Since the magnetic fluid seal part and the X-ring and flanged sleeve do not become misaligned with each other even when the device is subjected to strong impacts in truck transport or the like, there is no need to provide special packaging, and the work of packaging can also be facilitated.

The magnetic fluid seal device according to an eighth aspect of the present invention is the seal device according to any of the first through seventh aspects, characterized in that a partition wall formed of a non-magnetic material is provided between the magnetic source and the packing.

Through the eighth aspect, the degree of parallelism of the magnetic pole members can be maintained, and it is possible to reliably achieve a positioning whereby the appropriate clearance gap is provided for the packing.

The magnetic fluid seal device according to a ninth aspect of the present invention is the seal device according to any of the first through eighth aspects, characterized in that the packing comprises an X-ring.

Through the ninth aspect, since the magnetic fluid can be retained as a lubricant in the vicinity of the sliding part of the packing, sealing and lubrication can be reliably performed.

Effect of the Invention

The present invention has advantageous effects such as those described below.

(1) A flanged sleeve fixed to an external peripheral surface of the radially inside member of the two members and which rotates together with the inside member is provided facing the pair of magnetic pole members, a packing is disposed in an annular space formed by the radial inside of the magnetic source and the pair of magnetic pole members, the packing is provided in the annular space so as to slide on an external peripheral surface of the flanged sleeve, and the magnetic fluid seal part, the packing, and the flanged sleeve form a unit. Through this configuration, it is possible to provide a cartridge-type magnetic fluid seal device, in which the seal device is capable of sealing against dust, mist, and liquid, the magnetic fluid can be prevented from leaking, components can easily be replaced and assembled into the device, and the magnetic fluid can easily be enclosed in the device.

(2) The flanged sleeve comprises a cylindrical sleeve main body, an outward-facing flange part provided on an outboard side of the sleeve main body, and an inward-facing flange part and outward-facing flange part provided on an inboard side. Through this configuration, the magnetic fluid can be prevented from leaking by the outward-facing flange parts. The inward-facing flange part can also ensure correct positioning and installation relative to the inside members.

The sleeve main body of the flanged sleeve, the outward-facing flange part on the outboard side, the outward-facing flange part on the inboard side, and the inward-facing flange part on the inboard side are integrally or separately formed. Through this configuration, the flanged sleeve is easily fabricated, and the seal device can easily be assembled by retrofitting the outward-facing flange part on the inboard side.

(3) The sleeve main body of the flanged sleeve and the outward-facing flange part on the outboard side are formed of a magnetic material, and the outward-facing flange part on the inboard side is formed of a non-magnetic material. Through this configuration, any magnetic fluid that leaks out as a result of an impact or the like can be trapped by the distal end of the outward-facing flange part. Magnetic fluid that has leaked out near the outward-facing flange part on the inboard side L cannot be trapped, but this outward-facing flange part can still serve to prevent leakage of the magnetic fluid, and although some time is required, the magnetic fluid near the outward-facing flange part on the inboard side L that has been prevented from leaking is returned by the attraction of a strong magnetic field that occurs at the end part on the internal peripheral side of the magnetic pole members.

(4) A folded part folded toward the side of the magnetic pole members is provided to an outer edge of the outward-facing flange part on the outboard side and the outward-facing flange part on the inboard side of the flanged sleeve. Through this configuration, it is possible to prevent movement, relative to each other, of the flanged sleeve and the X-ring and magnetic fluid seal part, which is composed of the magnetic source, the pair of magnetic pole members, and the magnetic fluid. Since the magnetic fluid seal part and the X-ring and flanged sleeve do not become misaligned with each other even when the device is subjected to strong impacts in truck transport or the like, there is no need to provide special packaging, and the work of packaging can also be facilitated.

(5) A partition wall formed of a non-magnetic material is provided between the magnetic source and the packing. Through this configuration, the degree of parallelism of the magnetic pole members can be maintained, and it is possible to reliably achieve a positioning whereby the appropriate clearance gap is provided for the packing.

(6) The packing comprises an X-ring, and through this configuration, since the magnetic fluid can be retained as a lubricant in the vicinity of the sliding part of the packing, sealing and lubrication can be reliably performed.

BEST MODE FOR CARRYING OUT THE INVENTION

Embodiments of the magnetic fluid seal device according to the present invention will be described in detail with reference to the accompanying drawings. However, these embodiments shall not be interpreted as limiting the present invention, and various modifications, revisions, and improvements based on the knowledge of one skilled in the art can be made within the intended scope of the present invention.

(First Embodiment)

Figure 1:
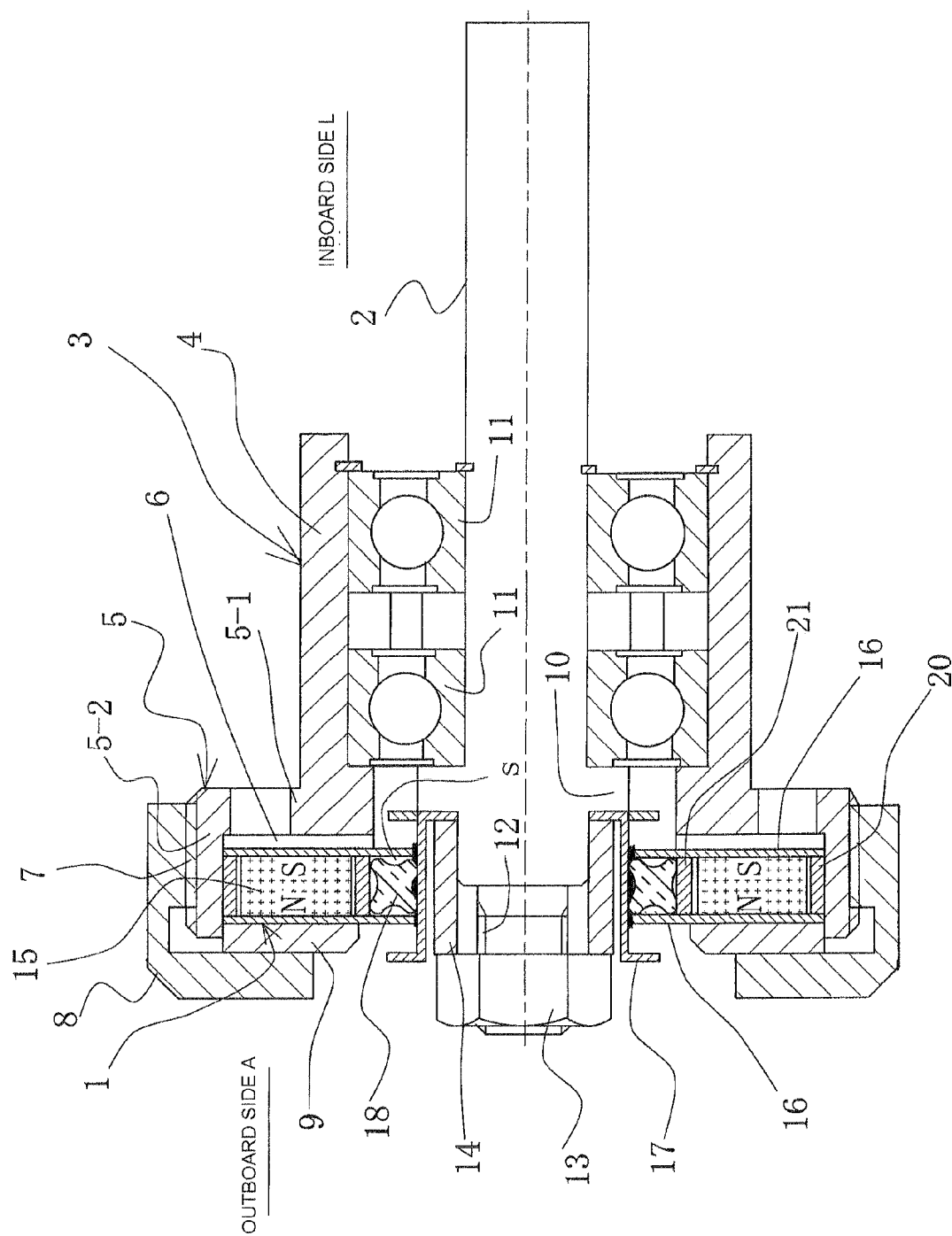
FIG. 1 is a schematic sectional view showing the magnetic fluid seal device according to a first embodiment of the present invention installed in a machine.

FIG. 1 is a schematic sectional view showing the magnetic fluid seal device according to a first embodiment of the present invention installed in a machine.

The magnetic fluid seal device 1 (referred to simply as the "seal device" below) is provided between a support member 3 and a rotating shaft 2 that extends over two regions referred to as an outboard side A (e.g., atmosphere side) and an inboard side L (e.g., the internal side of a fishing reel).

The support member 3 is a non-magnetic body provided with a cylinder part 4 for retaining and sealing the rotating shaft 2, and a flange part 5 for retaining the seal device 1 on the outboard side A of the cylinder part 4.

Bearings 11, 11 are provided between the rotating shaft 2 and the cylinder part 4 of the support member 3, and support the rotating shaft 2 so as to allow the rotating shaft to rotate.

The flange part 5 of the support member 3 is composed of a disk-shaped part 5-1 spreading in the radial direction, and a large-diameter cylinder part 5-2 extending in the axial direction, and the seal device 1 is housed in an annular space 6 of the flange part, formed by the disk-shaped part 5-1 and the large-diameter cylinder part 5-2.

A male screw part 7 is formed on an external peripheral surface of the large-diameter cylinder part 5-2 of the support member 3, and a presser ring 8 L-shaped in cross-section is screwed onto the male screw part 7. An annular spacer 9 is disposed between the presser ring 8 and the outboard side A surface of the seal device 1, and when the presser ring 8 is tightened in the axial direction, the seal device 1 is pressed in the axial direction from the outboard side A via the spacer 9.

A collar 10 for fixing the axial positioning of the bearings 11, 11 and the axial positioning of the seal device 1 is formed on the rotating shaft 2, the bearings 11, 11 are held in position against the collar 10 on the inboard side L thereof, and a flanged sleeve 17 (described hereinafter) of the seal device 1 is held in position against the collar 10 on the outboard side A thereof.

A male screw part 12 is formed at an end of the rotating shaft 2 on the outboard side A, and the flanged sleeve 17 of the seal device 1 is fixed in place against the collar 10 of the rotating shaft 2 by a nut 13 screwed onto the male screw part 12, a spacer 14 being provided between the nut and the flanged sleeve.

Figure 2:
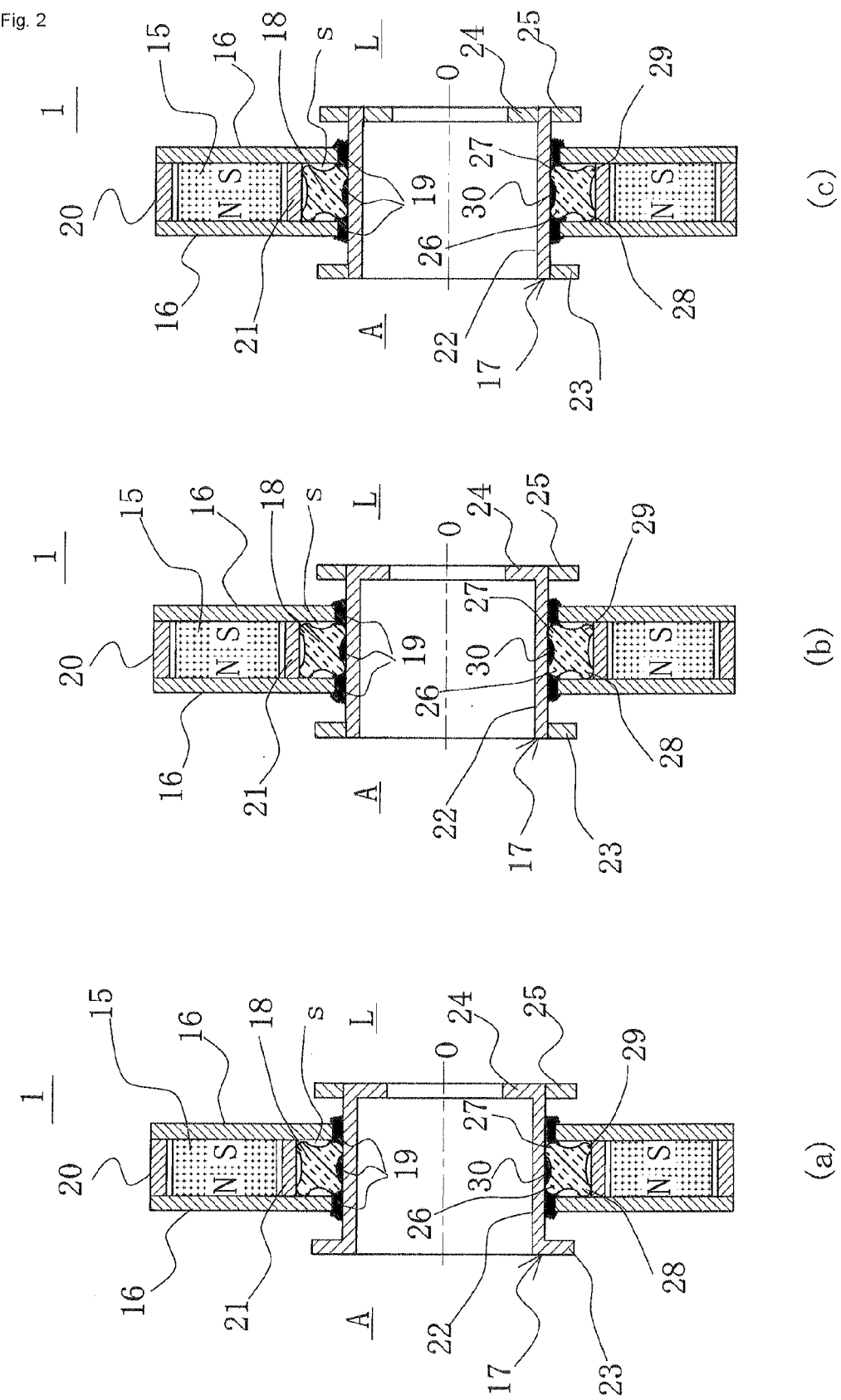
FIG. 2 is a schematic sectional view showing the magnetic fluid seal device according to the first embodiment of the present invention, and shows three aspects labeled (a), (b), and (c)

FIG. 2 is a schematic sectional view showing the magnetic fluid seal device 1 according to the first embodiment of the present invention, and the magnetic fluid seal device 1 will be described on the basis of FIG. 2.

The magnetic fluid seal device 1 is composed primarily of a magnet or other magnetic source 15, a pair of magnetic pole members 16, 16 disposed on both sides of the magnetic source 15, a flanged sleeve 17 fixed to an external peripheral surface of a rotating shaft 2 so as to face the pair of magnetic pole members 16, 16 and rotate together with the rotating shaft 2, a packing 18 disposed in an annular space s formed by the radial inside of the magnetic source 15 and the pair of magnetic pole members 16, 16 and provided to slide along an external peripheral surface of the flanged sleeve 17, and a magnetic fluid 19 magnetically retained between the magnetic pole members 16, 16 and the flanged sleeve 17 so as to seal a gap therebetween.

In the present invention, the portion formed by the magnetic source 15, the magnetic pole members 16, 16, and the magnetic fluid 19 is referred to generically as the magnetic fluid seal part.

The magnetic source 15 is annular in shape, and has unlike poles in the axial direction.

The magnetic pole members 16 are annular in shape and composed of a magnetic material, support the magnetic source 15 at a position toward the outside in the radial direction, and form the annular space s for housing the packing 18 at a position toward the inside in the radial direction. Partition walls 20, 21 composed of a non-magnetic material are provided on the external peripheral side and the internal peripheral side of the magnetic source 15. The partition walls 20, 21 are provided to maintain the degree of parallelism between the magnetic pole members 16 and to maintain dimensional precision with respect to the support member 3, and the partition wall 21 has the role of positioning (positioning to provide the appropriate clearance gap) the packing 18. In this regard, the partition wall 20 on the external peripheral side can be omitted, but the partition wall 21 on the internal peripheral side is essential for positioning the packing 18.

The flanged sleeve 17 is formed in parts according to fabrication and assembly requirements, and is composed of a cylindrical sleeve main body 22, an outward-facing flange part 23 provided on the outboard side A of the sleeve main body 22, and an inward-facing flange part 24 and outward-facing flange part 25 provided on the inboard side L.

In FIG. 2(a), the sleeve main body 22, outward-facing flange part 23 on the outboard side A, and inward-facing flange part 24 on the inboard side L of the flanged sleeve 17 are formed integrally with each other, and the outward-facing flange part 25 on the outboard side A of the flanged sleeve 17 is formed as a separate body and is attached by welding or other means after the magnetic source 15, the pair of magnetic pole members 16, 16, and the packing 18 have been fitted in the sleeve main body 22.

In FIG. 2(b), the sleeve main body 22 and the inward-facing flange part 24 on the inboard side L of the flanged sleeve 17 are formed integrally with each other, and the outward-facing flange part 23 on the outboard side A and the outward-facing flange part 25 on the inboard side L of the flanged sleeve 17 are formed as separate bodies and attached by welding or other means, but one of the outward-facing flange part 23 on the outboard side A and the outward-facing flange part 25 on the inboard side L is attached first, and the other is attached after the magnetic source 15, the pair of magnetic pole members 16, 16, and the packing 18 have been fitted in the sleeve main body 22.

In FIG. 2(c), the sleeve main body 22, the outward-facing flange part 23 on the outboard side A, the outward-facing flange part 25 on the inboard side L, and the inward-facing flange part 24 on the inboard side L of the flanged sleeve 17 are formed as separate bodies and subsequently integrated and attached by welding or other means, but one of the outward-facing flange part 23 on the outboard side A and the outward-facing flange part 25 on the inboard side L is first attached, and the other is attached after the magnetic source 15, the pair of magnetic pole members 16, 16, and the packing 18 have been fitted in the sleeve main body 22.

The sleeve main body 22 of the flanged sleeve 17 is formed of a magnetic material in order to form a magnetic circuit. The rotating shaft 2 may therefore be formed of a non-magnetic material. The outward-facing flange part 23 on the outboard side A, and the inward-facing flange part 24 and outward-facing flange part 25 on the inboard side L may be formed of a magnetic material or a non-magnetic material, and the outward-facing flange parts 23, 25 may be formed of rubber, resin, or another non-magnetic material rather than a metal material. The inward-facing flange part 24 on the inboard side L is used for fixing the flanged sleeve 17 to the rotating shaft 2, and is therefore preferably formed of a metal material.

The outward-facing flange parts 23, 25 are formed at a distance of approximately 0.5 to 1 mm from the outer surfaces of the magnetic pole members 16, and serve to prevent leakage of the magnetic fluid 19. A configuration may be adopted in which the outward-facing flange part 23 on the side on which leakage of the magnetic fluid 19 would cause problems, e.g., the outboard side A, is formed of a magnetic material, and any magnetic fluid 19 that leaks out is trapped by the outward-facing flange part 23. Of course, the outward-facing flange part 23 on the outboard side A and the outward-facing flange part 25 on the inboard side L may also both be formed of a magnetic material, and the magnetic fluid 19 may be trapped on both sides.

The packing 18 may be an O-ring, a gland packing, or any other packing capable of sealing against mist or liquid by sliding on the external peripheral surface of the flanged sleeve 17 and elastically deforming.

In the first embodiment, the magnetic fluid 19 is used as a lubricant for the packing 18, and an X-ring is therefore used, which is adapted for retaining the magnetic fluid 19 in the vicinity of the sliding part.

The packing 18 composed of an X-ring is an annular ring X-shaped in cross-section, and has four projections 26, 27, 28, 29 protruding toward the respective corners of a rectangular shape having the cross-sectional shape of the annular space s. The projections 26 and 27 on the internal peripheral side protrude toward a gap between the pair of magnetic pole members 16, 16 and the external peripheral surface of the flanged sleeve 17, and a retaining groove 30 shaped so as to be able to retain the magnetic fluid 19 is formed between the projections 26 and 27 on the internal peripheral side. The surface tension of the magnetic fluid 19 on both sides of the projections 26, 27 causes the magnetic fluid to penetrate into the sliding area between the projections 26, 27 and the external peripheral surface of the flanged sleeve 17, and the magnetic fluid 19 accumulates in the retaining groove 30. The sliding area between the projections 26, 27 and the external peripheral surface of the flanged sleeve 17 is therefore adequately lubricated.

Since the magnetic fluid 19 used in the first embodiment is obtained by dispersing magnetic particles having a particle diameter of approximately 5 to 50 nm in a solvent or oil (base oil) through use of a surfactant, the magnetic fluid 19 characteristically moves along magnetic force lines and is trapped in a magnetic field. In the magnetic fluid seal device 1 of the first embodiment, the magnetic fluid 19 is used as a lubricant for the sliding surfaces of the flanged sleeve 17 and the X-ring 18, and the service life of the X-ring 18 is thus prolonged. The magnetic fluid 19 can also maintain seal integrity at the sliding surfaces of the X-ring 18 and the flanged sleeve 17 and suppress the emission of dust near the sliding surfaces.

As the flanged sleeve 17 rotates about a rotational center O, the magnetic fluid 19 is magnetically retained between the magnetic pole members 16, 16 and the flanged sleeve 17, and seals the gap therebetween. A large quantity of the magnetic fluid 19 is also retained in the retaining groove 30 and near the distal ends of the projections 26, 27 of the X-ring 18. The magnetic fluid 19 can therefore also be used as a lubricant for the sliding area between the flanged sleeve 17 and the X-ring 18.

During production at a factory, the flanged sleeve 17, the X-ring 18, and the magnetic fluid seal part composed of the magnetic source 15, the magnetic pole members 16, 16, and the magnetic fluid 19 as shown in FIG. 2 are usually assembled, and the magnetic fluid 19 is also injected prior to shipment.

The magnetic fluid seal device of the present invention is thus characterized in being configured as a unit, and in the case that the unitized magnetic fluid seal device of the present invention is installed in an apparatus at another factory or on-site, the seal device can be easily and reliably installed by inserting the seal device 1 from the outboard side of the rotating shaft 2 and tightening the nut 13 via the spacer 14. In the case of replacement, a seal device 1 unitized at the production factory may be transported to the installation site and used intact for replacement, and there is no need for complicated operations such as injecting the magnetic fluid 19 on-site.

Figure 3:
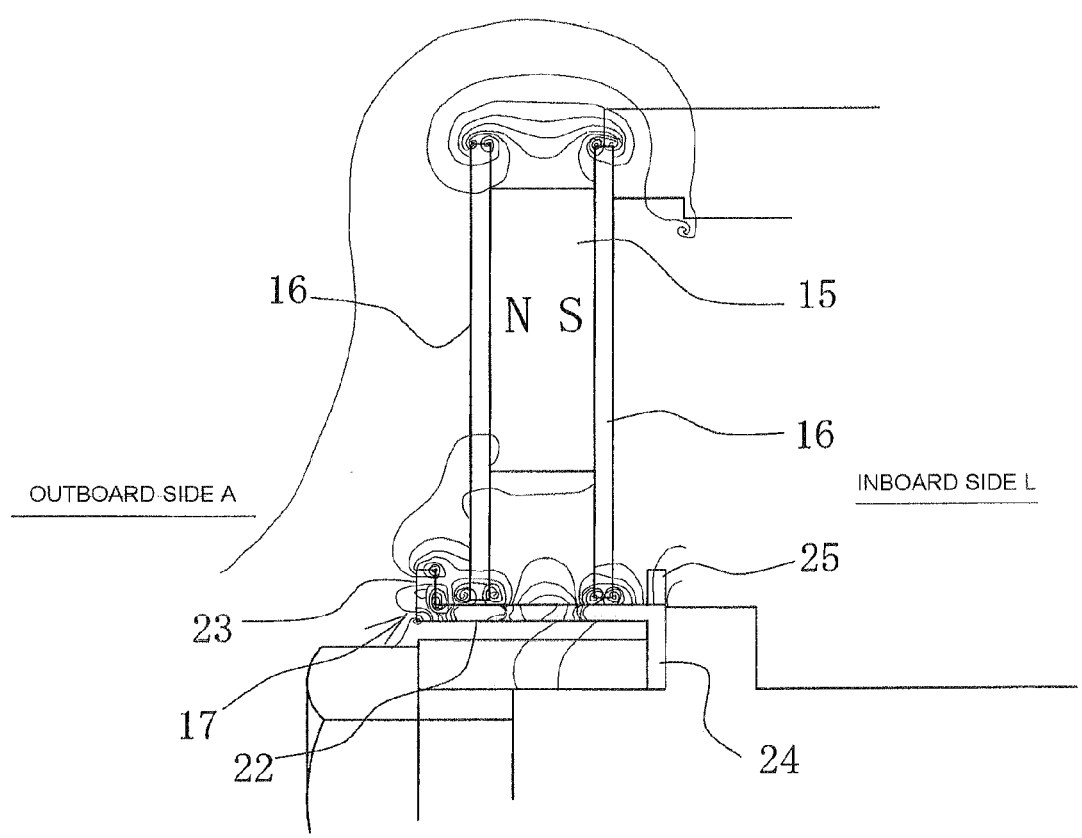
FIG. 3 is a view showing the results of magnetic field analysis of the relevant parts of the magnetic fluid seal device according to the first aspect of the present invention.

FIG. 3 is a view showing the results of magnetic field analysis of the relevant parts of the magnetic fluid seal device according to the first aspect of the present invention.

In the configuration shown in FIG. 3, the outward-facing flange part 23 on the outboard side A is formed of a magnetic material, and the outward-facing flange part 25 on the inboard side L is formed of a non-magnetic material. The magnetic force lines are dense at the distal end of the outward-facing flange part 23 on the outboard side, and it can be confirmed that the magnetic field is strong. Therefore any magnetic fluid 19 that leaks out as a result of an impact or the like can be trapped by the distal end of the outward-facing flange part 23. Since the magnetic force lines are sparse near the outward-facing flange part 25 on the inboard side L, the leaked magnetic fluid 19 cannot be trapped, but this outward-facing flange part 25 can still serve to prevent leakage of the magnetic fluid. Although some time is required, the leaked magnetic fluid near the outward-facing flange part 25 on the inboard side L is returned by the attraction of a strong magnetic field that occurs at the end part on the internal peripheral side of the magnetic pole members 16.

(Second Embodiment)

Figure 4:
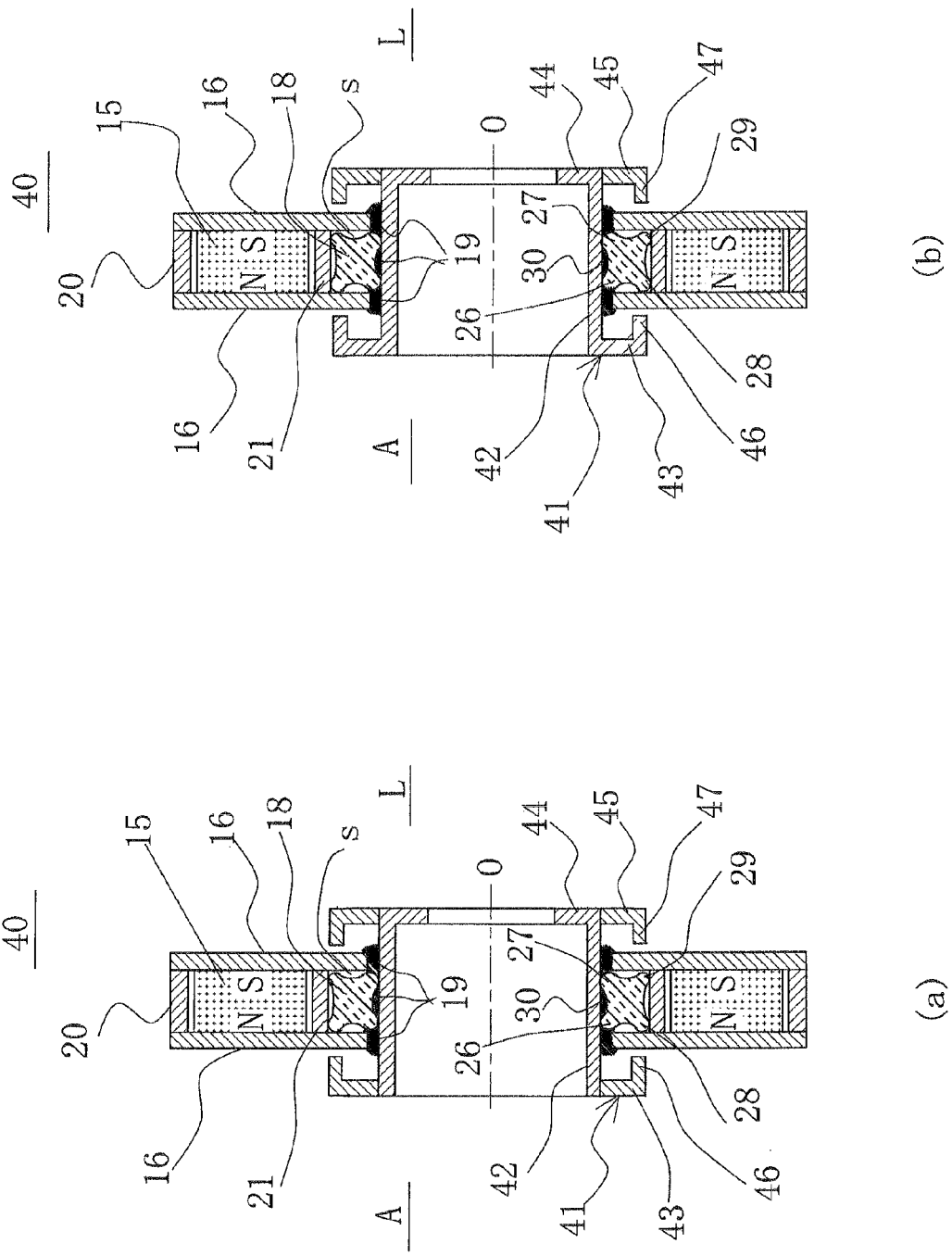
FIG. 4 is a schematic sectional view showing the magnetic fluid seal device according to a second embodiment of the present invention, and shows two aspects labeled (a) and (b)
Figure 5:
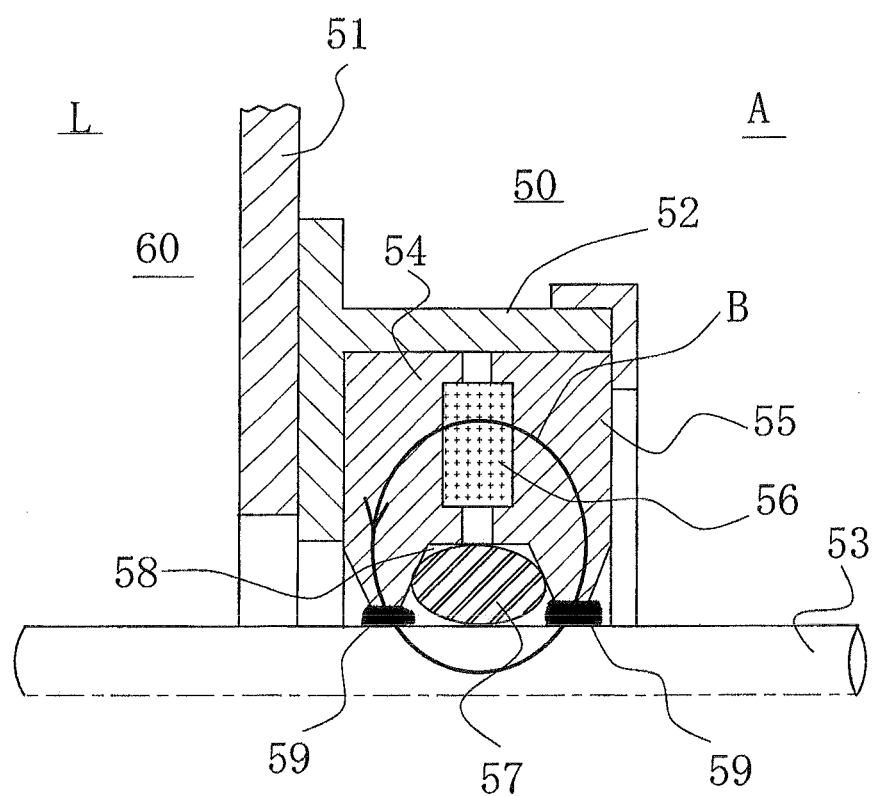
FIG. 5 is a sectional view showing Prior Art 1.
Figure 6:
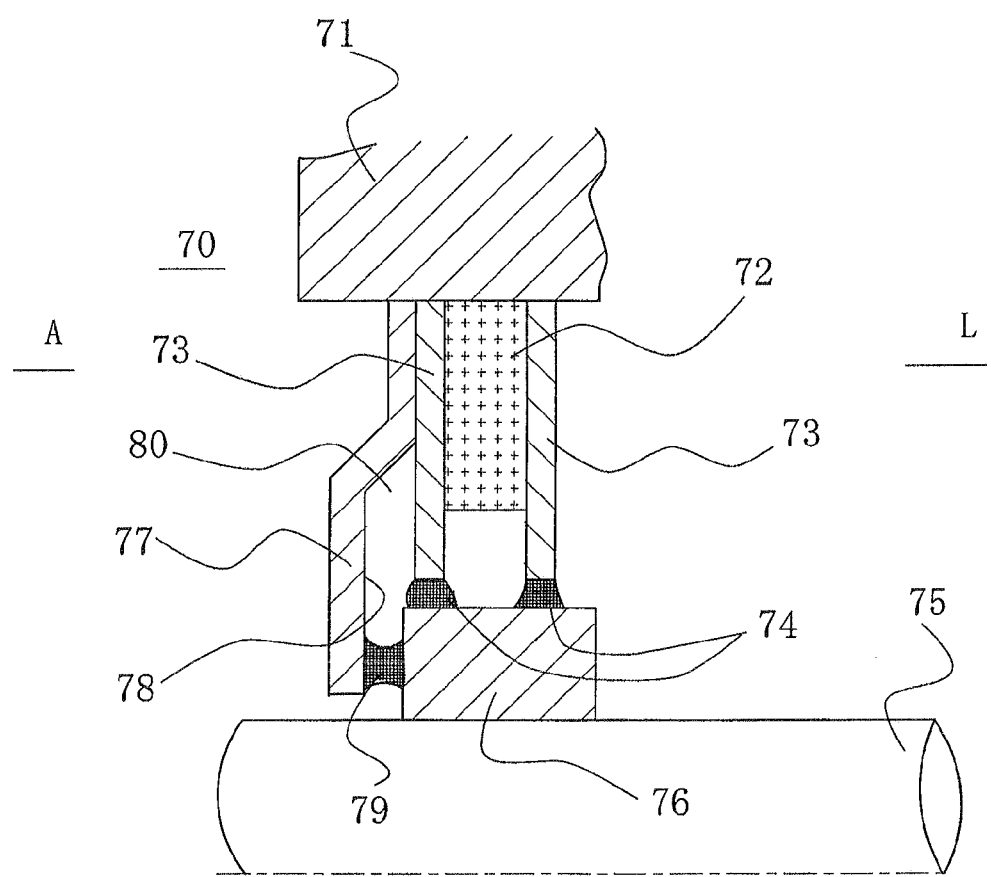
FIG. 6 is a sectional view showing Prior Art 2.
Figure 7:
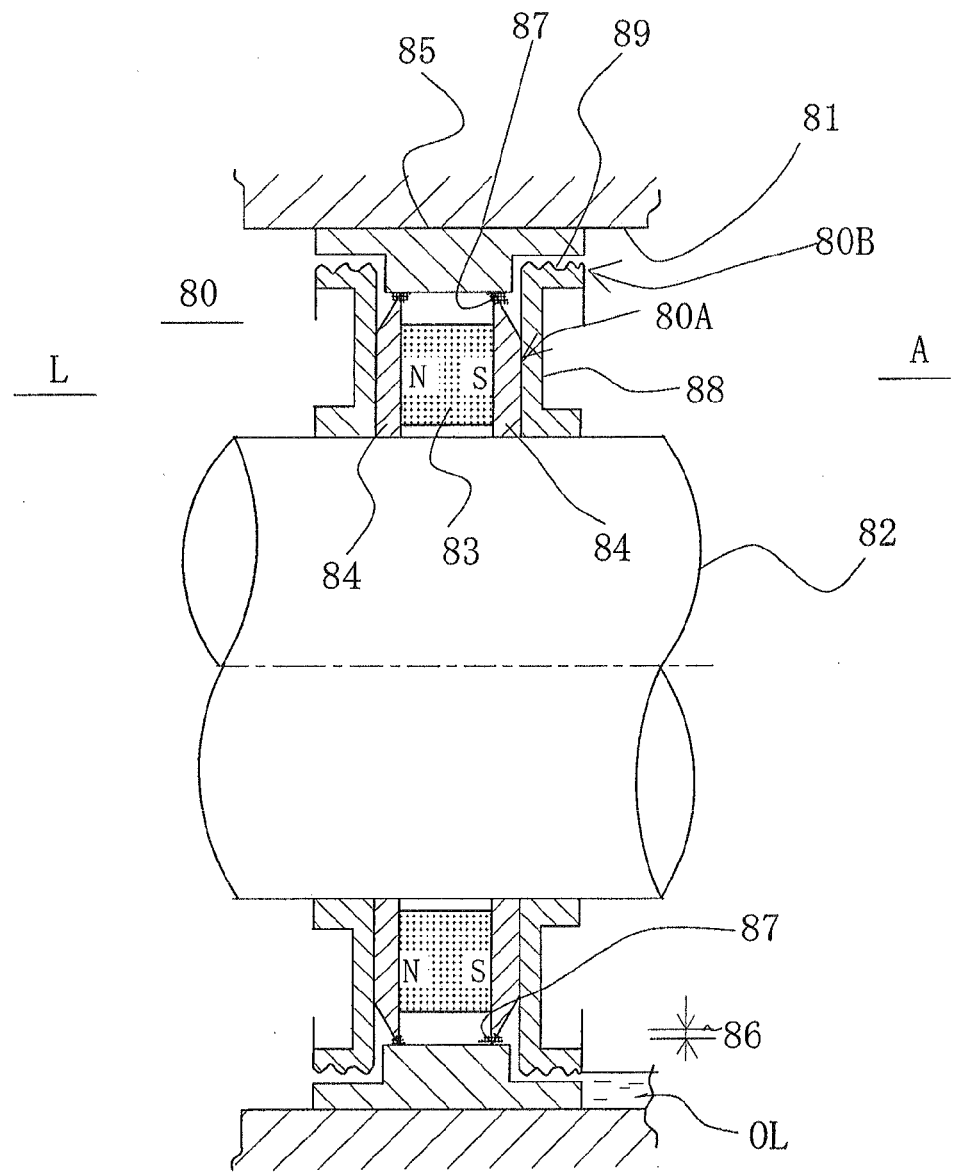
FIG. 7 is a sectional view showing Prior Art 3.

FIG. 4 is a schematic sectional view showing the magnetic fluid seal device according to a second embodiment of the present invention, and shows two aspects labeled (a) and (b).

In the magnetic fluid seal device 40 according to the second embodiment, the shape of the flanged sleeve 41 differs from the shape of the flanged sleeve 17 provided to the magnetic fluid seal device 1 of the first embodiment. However, the other aspects of the seal device of the second embodiment are the same as in the magnetic fluid seal device 1 of the first embodiment, and the same reference numerals used in the first embodiment are used to refer to the members in the second embodiment that are the same as in the first embodiment.

The flanged sleeve 41 is formed in parts according to fabrication and assembly requirements, and is composed of a cylindrical sleeve main body 42, an outward-facing flange part 43 provided on the outboard side A of the sleeve main body 42, and an inward-facing flange part 44 and outward-facing flange part 45 provided on the inboard side L, the same as in the first embodiment.

However, the second embodiment differs from the first embodiment in that folded parts 46, 47 are provided in which the outer edges of the outward-facing flange part 43 on the outboard side A and the outward-facing flange part 45 on the inboard side L are folded toward the magnetic pole members 16, 16.

In FIG. 4(*a*), the sleeve main body 42 and the inward-facing flange part 44 on the inboard side L of the flanged sleeve 41 are formed integrally with each other, and the outward-facing flange part 43 on the outboard side A and the outward-facing flange part 45 on the inboard side L of the flanged sleeve 41 are formed as separate bodies and attached by welding or other means, but one of the outward-facing flange part 43 on the outboard side A and the outward-facing flange part 45 on the inboard side L is attached first, and the other is attached after the magnetic source 15, the pair of magnetic pole members 16, 16, and the packing 18 have been fitted in the sleeve main body 42.

In FIG. 4(*b*), the sleeve main body 42, outward-facing flange part 43 on the outboard side A, and inward-facing flange part 44 on the inboard side L of the flanged sleeve 41 are formed integrally with each other, and the outward-facing flange part 45 on the outboard side A of the flanged sleeve 41 is formed as a separate body and is attached by welding or other means after the magnetic source 15, the pair of magnetic pole members 16, 16, and the packing 18 have been fitted in the sleeve main body 42.

The folded parts 46, 47 of the outward-facing flange part 43 and the outward-facing flange part 45, respectively, are provided to prevent movement, relative to each other, of the flanged sleeve 41 and the X-ring 18 and magnetic fluid seal part, which is composed of the magnetic source 15, the pair of magnetic pole members 16,16, and the magnetic fluid 19.

Since the X-ring 18 and the flanged sleeve 41 are tightly fitted together, friction prevents any misalignment absent a strong impact. However, in the case that the unitized seal device 40 is subjected to strong impacts in truck transport or the like, when a gap is present between the magnetic pole members 16, 16 and the outward-facing flange parts 23, 25 on the outboard side A, such as in the first embodiment, it is possible for the flanged sleeve 41 and the magnetic fluid seal part and X-ring 18 to become misaligned.

When folded parts 46, 47 are provided at the outer edges of the outward-facing flange parts 43, 45 as in the second embodiment, no misalignment occurs between the flanged sleeve 41 and the magnetic fluid seal part and X-ring 18. There is therefore no need to provide special packaging, and the work of packaging can also be facilitated.

Key to Symbols

1 seal device (first embodiment)
    2 rotating shaft
    3 support member
    4 cylinder part
    5 flange part
    5-1 disk-shaped part
    5-2 large-diameter cylinder part
    6 annular space of flange part
    7 male screw part
    8 presser ring
    9 spacer
    10 collar
    11 bearings
    12 male screw part
    13 nut
    14 spacer
    15 magnetic source
    16 magnetic pole members
    17 flanged sleeve
    18 packing
    19 magnetic fluid
    20 partition wall
    21 partition wall
    22 cylindrical sleeve main body
    23 outward-facing flange part on outboard side
    24 inward-facing flange part on inboard side
    25 outward-facing flange part on inboard side
    26 packing projection
    27 packing projection
    28 packing projection
    29 packing projection
    30 retaining groove
    40 seal device (second embodiment)
    41 flanged sleeve
    42 sleeve main body
    43 outward-facing flange part on outboard side
    44 inward-facing flange part on inboard side
    45 outward-facing flange part on inboard side
    46 folded part
    47 folded part
    A outboard side
    L inboard side
    O rotational center
    s annular space

The invention claimed is:

1. A seal device for sealing a gap between two members which are assembled so as to be able to rotate relative to each other in concentric fashion, the seal device comprising a magnetic fluid seal part having:

a magnetic source for generating magnetic force, the magnetic source being disposed on a radially outside member of said two members;

a pair of magnetic pole members disposed on two sides of said magnetic source; and a magnetic fluid for sealing said gap, the magnetic fluid being magnetically retained between said two members by the magnetic force of said magnetic source; wherein a flanged sleeve which is fixed to a radially inside member of said two members, and which rotates together with the inside member is provided facing radially internal ends of said pair of magnetic pole members, and a packing is disposed in an annular space formed by the radial inside of said magnetic source and the pair of magnetic pole members, the packing being slidable on said flanged sleeve, and wherein said flanged sleeve comprises: (a) a cylindrical sleeve main body integrally formed and having an external peripheral surface which faces the radially internal ends of said magnetic pole members and slidably contacts said packing, (b) a first outward-facing flange part provided on an outboard side of said sleeve main body which projects outwardly from the external peripheral surface of said sleeve main body, (c) an inward-facing flange part provided on an inboard side of said sleeve main body, which projects inwardly from an internal peripheral surface of said sleeve main body, wherein when the sleeve main body is assembled onto the radially inside member of the two members, a continuous gap is formed between an inner diameter surface of the sleeve main body and an outer diameter surface of the inside member, and (d) a second outward-facing flange part provided on the inboard side, which projects outwardly from the external peripheral surface of said sleeve main body, and wherein said first outward-facing flange part and said sleeve main body are welded onto or integrally formed with each other, said second outward-facing flange part and said sleeve main body being welded onto each other, said first and second outward-facing flange parts having outer diameters larger than inner diameters of said magnetic pole members, said inward-facing flange part being fixed to the radially inside member of said two members.

2. The magnetic fluid seal device according to claim 1, wherein the sleeve main body the first outward-facing flange part and the inward-facing flange part are integrally formed to one another, and the second outward-facing flange part is formed as a separate body.

3. The magnetic fluid seal device according to claim 1, wherein the sleeve main body and the inward-facing flange part side are integrally formed, and the first and second outward-facing flange parts are formed as separate bodies.

4. The magnetic fluid seal device according to claim 1, wherein the sleeve main body, the first outward-facing flange part, the second outward-facing flange part and the inward-facing flange part are formed as separate bodies.

5. The magnetic fluid seal device according to claim 1, wherein the sleeve main body and the first outward-facing flange part are formed of a magnetic material, and the second outward-facing flange part is formed of a non-magnetic material.

6. The magnetic fluid seal device according to claim 1, wherein first and second folded parts folded toward the side of the magnetic pole members are provided to outer edges of the first and second outward-facing flange parts.

7. The magnetic fluid seal device according to claim 1, wherein a partition wall formed of a non-magnetic material is provided between said magnetic source and the packing.

8. The magnetic fluid seal device according to claim 1, wherein said packing comprises an X-ring.

9. The magnetic fluid seal device according to claim 2, wherein the sleeve main body and the first outward-facing flange part are formed of a magnetic material, and the second outward-facing flange part is formed of a non-magnetic material.

10. The magnetic fluid seal device according to claim 3, wherein the sleeve main body and the first outward-facing flange part are formed of a magnetic material, and the second outward-facing flange part is formed of a non-magnetic material.

11. The magnetic fluid seal device according to claim 4, wherein the sleeve main body and the first outward-facing flange part are formed of a magnetic material, and the second outward-facing flange part is formed of a non-magnetic material.

12. The magnetic fluid seal device according to claim 2, wherein said packing comprises an X-ring.

13. The magnetic fluid seal device according to claim 3, wherein said packing comprises an X-ring.

14. The magnetic fluid seal device according to claim 4, wherein said packing comprises an X-ring.

15. The magnetic fluid seal device according to claim 5, wherein said packing comprises an X-ring.

16. The magnetic fluid seal device according to claim 6 wherein said packing comprises an X-ring.

17. The magnetic fluid seal device according to claim 7, wherein said packing comprises an X-ring.

* * * * *